May 18, 1971 P. E. LAWLER 3,579,430

APPARATUS FOR ELECTROPLATING WIRE

Filed March 13, 1969 2 Sheets-Sheet 1

INVENTOR
P. E. LAWLER
BY D. D. Bosben
ATTORNEY

United States Patent Office 3,579,430
Patented May 18, 1971

3,579,430

APPARATUS FOR ELECTROPLATING WIRE

Philip E. Lawler, Papillion, Nebr., assignor to Western Electric Company, Incorporated, New York, N.Y.

Filed Mar. 13, 1969, Ser. No. 806,899
Int. Cl. C23b 5/08
U.S. Cl. 204—206 5 Claims

ABSTRACT OF THE DISCLOSURE

In apparatus for electroplating wire, in which the wire is advanced longitudinally through a plating tank, the wire passes over electrical contact members mounted externally of the plating tank adjacent its wire entrance and wire exit ends. The contact members are rotatably driven by separate adjustable torque motors so as to maintain the wire under tension and thereby maintain good electrical contact between the wire and the contact members. In order that the tension in the wire, and thus the plating current flowing in the system, will be maintained at substantially uniform values, the magnitude of friction variables in the system is reduced by fixedly mounting each contact member on a cantilevered portion of a drive shaft of its respective motor, and by feeding electrical current into each contact member through a single contact brush engageable therewith at its axis of rotation.

BACKGROUND OF THE INVENTION

(1) Field of the invention

This invention relates to the electroplating of wire in which the wire is advanced longitudinally through a plating tank containing a plating solution, and is particularly suited to the tinning of wire prior to the extrusion of insulation on the wire on a wire insulating line.

(2) Description of the prior art

In the manufacture of insulated copper wire which is used in certain communication cables, it is standard practice to advance the wire along an insulating line and to electroplate the wire with tin prior to extruding insulation on the wire. The tinning operation involves advancing the wire longitudinally through a tank containing an electrolytic tinning solution and a plurality of tin bars for maintaining the tin in the solution at a desired concentration. Adjacent wire entrance and wire exit ends of the tank the wire travels over electrical contact rollers, the contact rollers and the tin bars being connected to a suitable electrical power source so that tin is plated out of the solution onto the wire as it advances through the tinning solution. In certain known apparatus the contact rollers have been mounted in the tank directly in the tinning solution, and in other known apparatus they have been mounted externaly of the tank. Electric current has been fed into the contact rollers in various ways, such as through friction-type contact brushes, or by mounting the contact rollers on electrically conducting fluid bearings.

In tinning the wire it is necessary that a certain thickness of tin be applied thereto before the insulation is extruded thereon and the moving wire must remain in the tinning solution until the desired plating thickness has been achieved. Thus, the rate at which the tin is applied to the wire in the tinning tank has a direct bearing on the rate at which the wire can be advanced along the insulating line.

In an effort to increase the line speed of the wire and still obtain the necessary plated thickness of tin on the wire, various systems have been proposed. For example, it is common practice to pass the wire back and forth through the tinning solution several times by training it about a series of electrical contact rollers adjacent the wire entrance and wire exit ends of the tank, before it passes along the insulating line to the extrusion apparatus. In this way the wire travels in the tinning solution the necessary length of time without utilizing an excessively long tinning tank which would occupy too much space on the insulating line. Further, since the tinning rate is dependent on the magnitude of the plating current in the system, the contact rollers have been rotatably driven so as to produce tension in the wire and thereby provide good electrical contact between the wire and the contact rollers. In an effort to prevent stretching of the wire, this driving of the contact rollers has been accomplished by adjustable torque motors which are preset so as not to create excessive tension in the wire.

Prior known apparatus for tinning wire, however, have not proven entirely satisfactory, especially at high line speeds, for several reasons. For example, each pass which the wire makes in a multipass system travels about a different contact roller surface portion. If the contact roller surface portions are not uniform in nature, or if the contact rollers are not exactly parallel, current arcing or excessive vibration frequently develops, causing wire breaks from burnout or stretching of the wire.

In addition, even when torque motors are used to drive the contact rollers, it is difficult to maintain uniform tension in the wire, and thus a uniform plating current in the system. Applicant attributes this difficulty, at least in part, to the fact that there are certain variable friction forces in the system which the drive motors must continuously overcome, in addition to driving the contact rollers. For example, the inherent friction in the bearings for mounting the contact rollers, creates variable friction forces which must be overcome by the drive motors. This condition is further aggravated where the contact rollers are located in the tinning solution and journalled in side walls of the tank, since the bearings tend to become corroded from the tinning solution. Further, the use of contact brushes for feeding current into the contact rollers also produces additional variable friction forces which must be overcome by the motors.

SUMMARY OF THE INVENTION

An object of the invention is to provide new and improved apparatus for electroplating a longitudinally advancing wire.

A further object of the invention is to provide new and improved apparatus for electroplating a longitudinally advancing wire in which the danger of stretching of the wire is substantially eliminated.

A still further object of the invention is to provide new and improved apparatus for electroplating a longitudinally advancing wire in which the plating current is maintained at a substantially uniform value during the plating operation, as compared to prior known apparatus.

Another object of the invention is to provide new and improved apparatus for electroplating a longitudinally advancing wire in which the tinning rate is substantially increased and the plating time is substantially reduced as compared to prior known apparatus.

A further object of the invention is to provide new and improved apparatus for electroplating a longitudinally advancing wire at relatively high speeds.

In accordance with the invention, in apparatus for electroplating wire in which the wire is advanced longitudinally through a plating tank, the wire passes over electrical contact members located externally of the plating tank adjacent its wire entrance and exit ends. The contact members are rotatably driven by respective motors so as to maintain a preselected tension in the wire and good electrical contact between the wire and the contact members, with each contact member being fixedly mounted on a cantilevered portion of a drive shaft of its respective motor, and with electrical current being fed into each contact member through a single contact brush engageable therewith at its axis of rotation.

DETAILED DESCRIPTION

Figure 1:
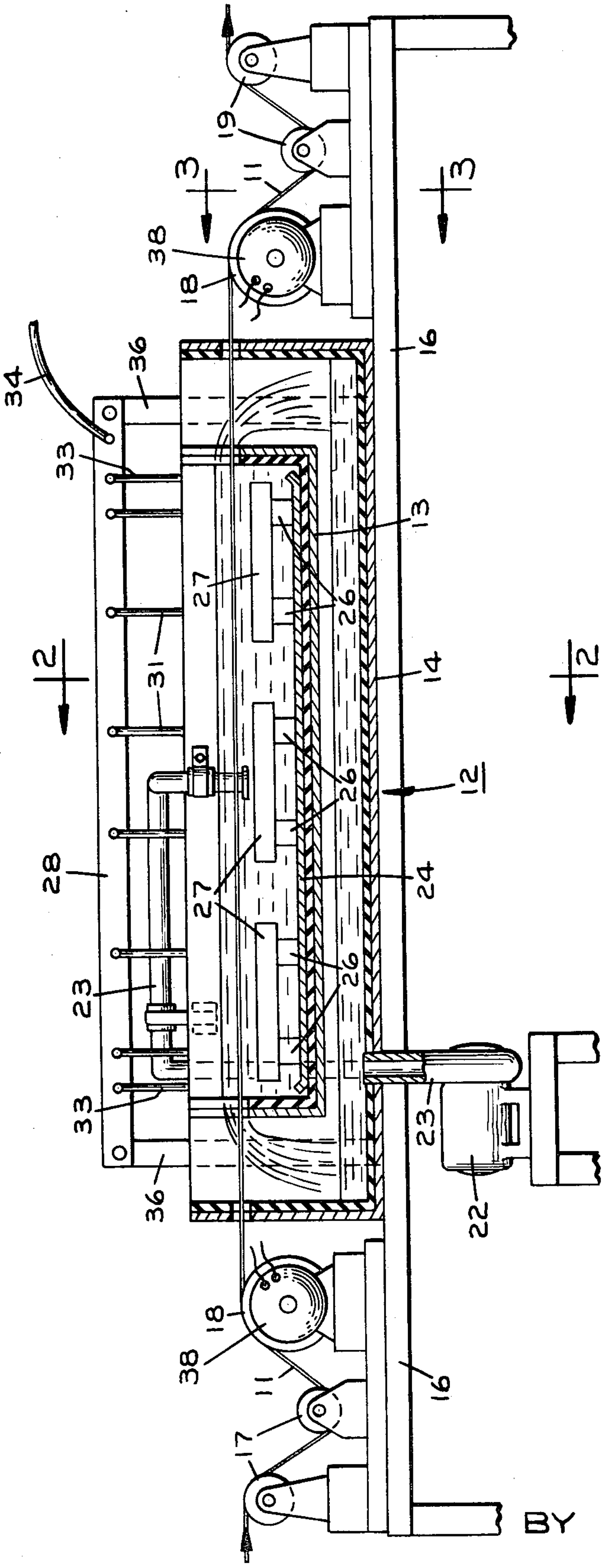
FIG. 1 is a side elevational view of wire electroplating apparatus in accordance with the invention partially in cross-section.

Referring to FIG. 1, the invention is disclosed as applied to the electroplating of a wire 11 of a metal such as copper, with a metal such as tin, prior to the extrusion of a plastic jacket on the wire on an insulating line. The invention is particularly suited, but not necessarily restricted, to the electrotinning of the wire 11 at high speed, such as 3,000 feet per minute.

The wire 11 is advanced along the insulating line from left to right in FIG. 1 from a source of supply and passes through a wire drawing machine, an annealer and a cleaning tank, none of which is shown. The wire 11 then passes through a tank assembly 12 which includes a tinning tank 13 in which a preselected amount of tin, such as two–three milligrams per square inch, which produces a coating approximately twenty-five microinches in thickness, is electroplated on the wire. The tank assembly 12 also includes an overflow reservoir 14 which is suitably mounted on a support table 16. Subsequently, the tinned wire passes to extrusion apparatus (not shown) which applies a coating of plastic insulation on the wire, and ultimately the insulated wire is wound upon a reel by a takeup mechanism (not shown).

Prior to entering the tank assembly 12, the wire 11 travels over a set of idler sheaves 17 and over a first electrical contact sheave 18 located externally of the tank assembly adjacent its wire entrance end. The wire 11 next passes through an aperture in an end wall of the overflow reservoir 14 and enters the tinning tank 13 through a vertical slot in an end wall thereof. The wire 11 continues through the tinning tank 13 and exits therefrom through another vertical slot in its opposite end wall and then passes through an aperture in an opposite end wall of the overflow reservoir 14. The wire then travels over a second electrical contact sheave 18 located externally of the tank assembly 12 adjacent its wire exit end, and over a second set of idler sheaves 19 before proceeding to the next processing operation.

The tinning tank 13 contains a suitable tinning solution, such as stannous fluoborate, and during a tinning operation the tinning solution flows out of the tinning tank through the vertical slots in its end walls and into the overflow reservoir 14. The solution then is recirculated back to the tinning tank by a pump 22 and suitable piping 23 in a well-known manner.

Figure 2:
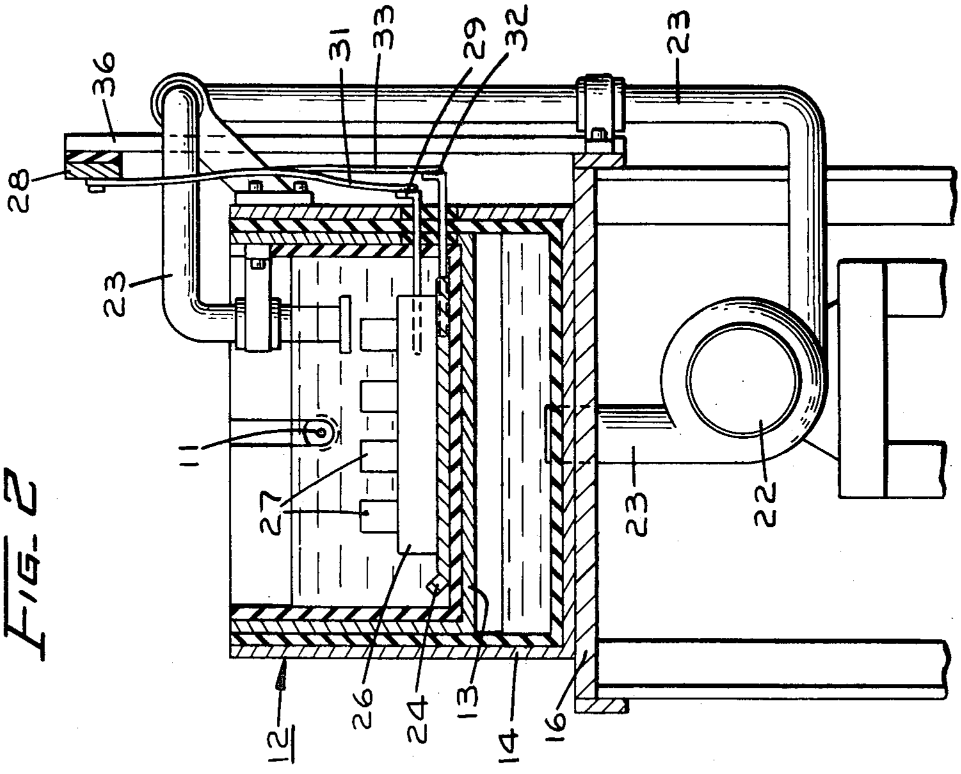
FIG. 2 is an enlarged cross-sectional view of the apparatus taken along the line 2—2 of FIG. 1.

The tinning tank 13 is fixedly supported in the overflow reservoir 14 in any suitable manner and the tank and the reservoir both are lined with an electrical insulating material, such as neoprene rubber. A tray 24 of an electrically conducting material, such as stainless steel, is mounted on the bottom of the tinning tank 13 and a plurality of spaced bars 26 of an electrically conducting material, such as copper, are supported on the tray and have a plurality of tin bars 27 resting thereon. Each of the copper bars 26 is electrically connected to an overhead bus bar 28 by an electrically conducting rod 29 (one shown in FIG. 2) and an electrical cable 31, the rod having an inner end portion secured in the copper bar and extending outward through side walls of the tinning tank 13 and the overflow reservoir

14, with the electrical cable connecting an outer end of the rod to the bus bar. Similarly, the stainless steel tray 24 is electrically connected to the bus bar 28 by a plurality of electrically conducting rods 32 (one shown in FIG. 2) and electrical cables 33. The bus bar is connected to a suitable electrical power source (not shown), such as a D.C. rectifier, by an electrical cable 34, and is fixedly secured to upper portions of vertical uprights 36, from which it is suitably insulated. The uprights 36 are secured adjacent their lower ends to the support table 16.

Figure 3:
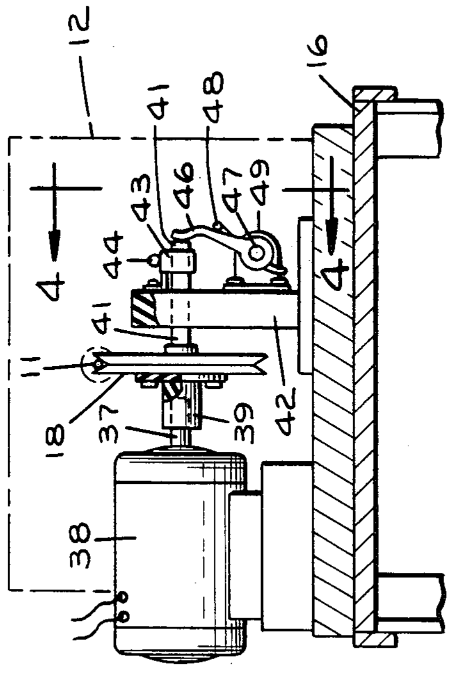
FIG. 3 is an enlarged cross-sectional view of the apparatus taken along the line 3—3 of FIG. 1.

The tinning rate, and thus the maximum line speed at which the wire 11 can travel through the tinning tank 13 and still have the desired thickness of tin plated thereon, is dependent upon the magnitude of the plating current flowing in the electroplating system, and for uniform plating the plating current must be maintained at a substantially constant value. Accordingly, both of the electrical contact sheaves 18 are power driven to maintain a preselected tension in the wire 11 as it approaches the first electrical contact sheave 18, and in the portion of the wire between the two contact sheaves, without stretching the wire, so as to provide good electrical contact between the contact sheaves and the wire. Referring to FIG. 3, in accordance with this invention, this is accomplished by fixedly mounting each of the electrical contact sheaves 18 on a cantilevered portion of a drive shaft 37 of a respective adjustable D.C. torque motor 38, such as the model 1019–001 of the Acromag Company of Wixom, Mich. In a tinning operation, each of the torque motors 38 is set by a rheostat control (not shown) to drive its respective contact sheave 18 at a peripheral speed slightly in excess of the line speed of the wire 11. In the illustrated embodiment of the invention, each electrical contact sheave 18 is mounted on its respective motor drive shaft 37 by being secured to a circular flange of a member 39 of electrical insulating material, by suitable screws, and the insulating member is force fitted or otherwise suitably mounted on an outer end portion of the motor drive shaft.

By fixedly mounting each electrical contact sheave 18 on the drive shaft 37 of its respective motor 38, the necessity for supporting the contact sheave in bearing mountings is eliminated, whereby the motor does not have to overcome the variable frictional forces usually present in such bearing mountings and the portion of its power which would otherwise be wasted for this purpose is available on a continuous basis for driving the contact sheave. Thus, each motor 38 is better able to drive its respective contact sheave 18 at a constant speed so as to maintain the tension in the wire 11 at a uniform value, thereby insuring that the current flow from the contact sheaves into the wire is maintained at a substantially constant value for optimum plating.

Further uniformity in the speed at which each contact sheave 18 is driven by its drive motor 38, and thus better maintenance of the current flow from the sheaves into the wire 11 at a substantially constant value, also is achieved by feeding electrical current into each contact sheave through a single contact brush 41 engaged with the contact sheave on its axis of rotation. With this arrangement, the moment arm of the engaged surface portions of the brush 41 and the contact sheave 18 is reduced to a minimum and the frictional drag produced by the brush on the contact sheave, being another variable friction force which its drive motor 38 must overcome, is minimized so that the effect which this drag has on producing variable tension in the wire, and thus fluctuations in the plating current, is negligible.

Figure 4:
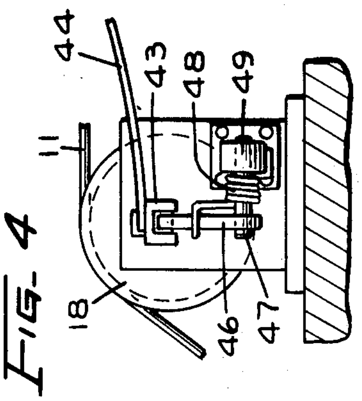
FIG. 4 is an elevational view of a portion of the apparatus as viewed along the line 4—4 of FIG. 3.

As is shown in FIGS. 3 and 4, in the illustrated embodiment of the invention, each contact brush 41 is mounted for slidable movement in a rectangular aperture in an upper portion of a holder 42 of electrical insulating material, and is rectangular in cross section so as to be non-rotatable. A portion of the brush 41 is slidably received between resilient legs of a clip-type contactor 43 mounted on the holder 42 and connected to the above-mentioned electrical power source by a lead 44. The brush 41 also is biased to the left in FIG. 3 into engagement with a central hub portion of its respective contact sheave 18 by a lever member 46. In this connection, the lever member 46 is pivotally mounted on a portion of a shaft 47 and is biased counterclockwise in FIG. 3 by a coil spring 48, and also is pivotable clockwise in this figure to permit replacement of the contact brush 41 as necessary. Another portion of the shaft 47 is fixedly mounted in a bracket 49 secured to the holder 42.

Summarizing, in operation the torque motors 38 are set to drive their respective contact sheaves 18 at a peripheral speed slightly in excess of the line speed of the wire 11, so as to maintain the wire under tension without stretching it, thereby providing good electrical contact between the sheaves and the wire at all times. In this connection, since the friction variables in the electroplating system have been reduced to a minimum by fixedly mounting the contact sheaves 18 on the drive shafts 37 of their respective torque motors 38, and by feeding electrical current into each contact sheave through the single contact brush 41 at its axis of rotation, substantially the full power of each motor is available on a continuous basis for driving its respective contact sheave. Thus, each contact sheave 18 is driven at a substantially constant speed so as to maintain uniform tension in the wire 11 as it travels over the contact sheave. Accordingly, a substantially uniform degree of electrical contact is maintained between the contact sheaves 18 and the wire 11, whereby the current being fed into the electroplating system through the wire is maintained at a substantially constant value so that as the wire passes through the tinning tank 13 a uniform coating of tin of the desired thickness is plated thereon.

What is claimed is:

1. Apparatus for electroplating wire in which the wire is advanced longitudinally through a plating tank containing a plating solution, which comprises:

a first rotatably driven electrical contact member located externally of the plating tank adjacent an entrance end thereof and over which the wire passes prior to entering the tank;

a second rotatably driven electrical contact member located externally of the plating tank adjacent a wire exit end thereof and over which the wire passes after travelling through the tank;

separate motors for rotating respective ones of said electrical contact members so as to maintain a preselected tension in the wire and good electrical contact between the wire and said electrical contact members, each of said motors including a cantilevered drive shaft; and means for fixedly mounting each of said electrical contact members on a cantilevered portion of a respective one of the drive shafts of said motors.

2. Apparatus for electroplating wire in which the wire is advanced longitudinally through a plating tank containing a plating solution, as recited in claim 1, in which:

the wire is freely suspended between said electrical contact members and adapted to make only a single pass through the plating tank.

3. Apparatus for electroplating wire in which the wire is advanced longitudinally through a plating tank containing a plating solution, as recited in claim 1, in which:

each of said drive motors is an adjustable speed torque motor.

4. Apparatus for electroplating wire in which the wire is advanced longitudinally through a plating tank containing a plating solution, as recited in claim 1, in which:

each of said mounting means is a member of electrical insulating material secured to its respective electrical contact member and its respective drive shaft so that said electrical contact member is electrically insulated from said drive shaft.

5. Apparatus for electroplating wire in which the wire is advanced longitudinally through a plating tank containing a plating solution, as recited in claim 1, which further comprises:

a single contact brush engageable with each of said electrical contact members on its axis of rotation for feeding electrical current through said electrical contact member and into the wire.

References Cited

UNITED STATES PATENTS 2,667,453 1/1954 Murray ............ 204—28

JOHN H. MACK, Primary Examiner

W. SOLOMON, Assistant Examiner

U.S. Cl. X.R.

204—225